United States Patent [19]

Dauvergne

[11] 4,334,713
[45] Jun. 15, 1982

[54] HYDRAULIC CONTROL SYSTEM

[75] Inventor: Jean L. R. Dauvergne, Fosses, France

[73] Assignee: Societe Anonyme Francaise du Ferodo, Paris, France

[21] Appl. No.: 150,410

[22] Filed: May 13, 1980

[30] Foreign Application Priority Data

May 21, 1979 [FR] France ............................. 79 12854

[51] Int. Cl.³ ............................................. B60T 15/06
[52] U.S. Cl. ......................................... 303/54; 303/56
[58] Field of Search .................... 303/10, 11, 50, 52, 303/54, 56; 251/227, 245

[56] References Cited

U.S. PATENT DOCUMENTS

| | | | |
|---|---|---|---|
| 2,752,947 | 7/1956 | Hruska | 303/54 X |
| 3,003,825 | 10/1981 | Kemble | 303/54 |
| 3,169,804 | 2/1965 | Bueler et al. | 303/52 |
| 3,515,441 | 6/1970 | Stein | 303/54 |

*Primary Examiner*—Duane A. Reger
*Attorney, Agent, or Firm*—Young & Thompson

[57] ABSTRACT

A hydraulic control system, for at least one hydraulic braking circuit, comprising a control unit, a brake pedal, an assisting hydraulic pressure plant having a fluid pressure source and a reservoir, a distributor valve having a slide fitted movably in the control unit between a rest position, when the braking circuit connects with the reservoir, and an active position, when the braking circuit is pressurized. This slide is urged in one direction by the pedal and in the opposite direction by the pressure in the braking circuit. The slide moves only about a millimeter, and to give the driver a resonable pedal displacement, a first resilient device, in the form of either stepped parallel or in series helical springs or an elastomer block, is disposed between the pedal and slide. To avoid excessive braking except in a real emergency, a second resilient device, either a spring or the elastomer block, is disposed between the pedal and unit and is adapted to be actuated by the pedal for only a fraction of the pedal stroke at its end of travel, to warn the driver that the end of travel is being approached.

13 Claims, 9 Drawing Figures

HYDRAULIC CONTROL SYSTEM

BACKGROUND OF THE INVENTION

The present invention relates to an hydraulic control system, particularly for a motor vehicle braking apparatus, having at least one hydraulic braking circuit, the hydraulic control system being of the kind comprising a control unit, a brake pedal, an assisting hydraulic pressure plant having a fluid pressure source and a reservoir, a distributor valve having a slide fitted movably in the control unit between a rest position in which it places the braking circuit in communication with the reservoir, and an active position in which it places the braking circuit in communication with the fluid pressure source, said slide being subject to two opposing forces, one of which is developed by the pedal and tends to bring it into the active position, whereas the other is developed by the pressure of the said at least one braking circuit and tends to return it into the rest position, first resilient stroke simulator means being interposed between the pedal and the slide, whereas second resilient means are interposed between the pedal and the unit.

In hydraulic control systems of this type, the movement stroke of the slide of the distributor valve to increase or decrease the hydraulic pressure in the braking circuit as a function of the force exerted by the driver on the pedal, which force is a measure of the driver's intention to increase or decrease the braking, is very small, e.g. of the order of one millimeter. This is the reason why the pedal stroke simulator means interposed between the pedal and the slide are provided. In this way the driver is able to displace the pedal with his foot through a stroke which is not of the order of a millimeter, but the value of which is more appropriate for driving convenience, that is to say of the order of ten centimeters, which gives the driver total control of braking, with a feeling similar to that which is obtained with an unassisted control, and with greater efficacity.

The second resilient means interposed between the pedal and the unit generally has hitherto had the function of a simple resilient return means, and customarily acts all along the stroke of the pedal.

In apparatuses of this type, which have the advantage of enabling good control of a braking system with a smaller muscular effort, it is sometimes found that this very facility can lead to excess. In fact the pressure of the hydraulic plant must be made stronger than necessary for ordinary requirements, to allow for the reduction in the efficiency of the brakes when the latter are hot. In the case of danger, even an experienced driver may press the pedal too suddenly, which, because of the pressures developed by the hydraulic plant, may cause locking of the wheels, or even rupture of the braking circuit.

The object of the present invention is to provide an hydraulic control system of the kind hereinbefore described, which is free of this disadvantage and which enables, with a simple and robust construction, excellent braking conditions without the risk of harmfully excessive pressure, whilst giving the driver the possibility of developing good braking pressure even when the brakes are very hot.

SUMMARY

The invention provides an hydraulic control system of the kind hereinbefore described, in which the second resilient means, interposed between the pedal and the unit, comprise resilient end of stroke saturator means adapted to act only after a predetermined fraction of the stroke of the first resilient stroke simulator means interposed between the pedal and the slide.

By virtue of this arrangement, at the moment of braking, the pedal first of all overcomes only the resistance offered by the first resilient stroke simulator means interposed between the pedal and the slide, with the result that effective deceleration of the vehicle is achieved under favourable conditions.

If the urgency of the braking so requires, and the driver is compelled to depress the pedal until the resistance offered after a predetermined fraction of stroke by the second resilient means interposed between the pedal and the unit is encountered, the driver is warned by a suddenly increased resistance, and it is with full knowledge that he exerts greater force to depress the brake pedal so as to increase the deceleration. But there is then no longer any risk of excessive pressure in the brakes, and the final braking is effected in a particularly efficacious and safe manner.

The first resilient means may comprise one spring or more than one stepped spring fitted in parallel or in series, or again be formed by an elastomer block.

The second resilient means may likewise be constituted either by a spring, or by an elastomer block.

In one embodiment of the invention, it is one and the same elastomer block which performs the function of the first and of the second resilient means.

DESCRIPTION OF THE PREFERRED EMBODIMENTS

Reference will be made first of all to FIGS. 1 to 6, which relate by way of a non limitative example to an application of an hydraulic control system according to the invention to a motor vehicle braking apparatus having two independent braking circuits.

Figure 1:
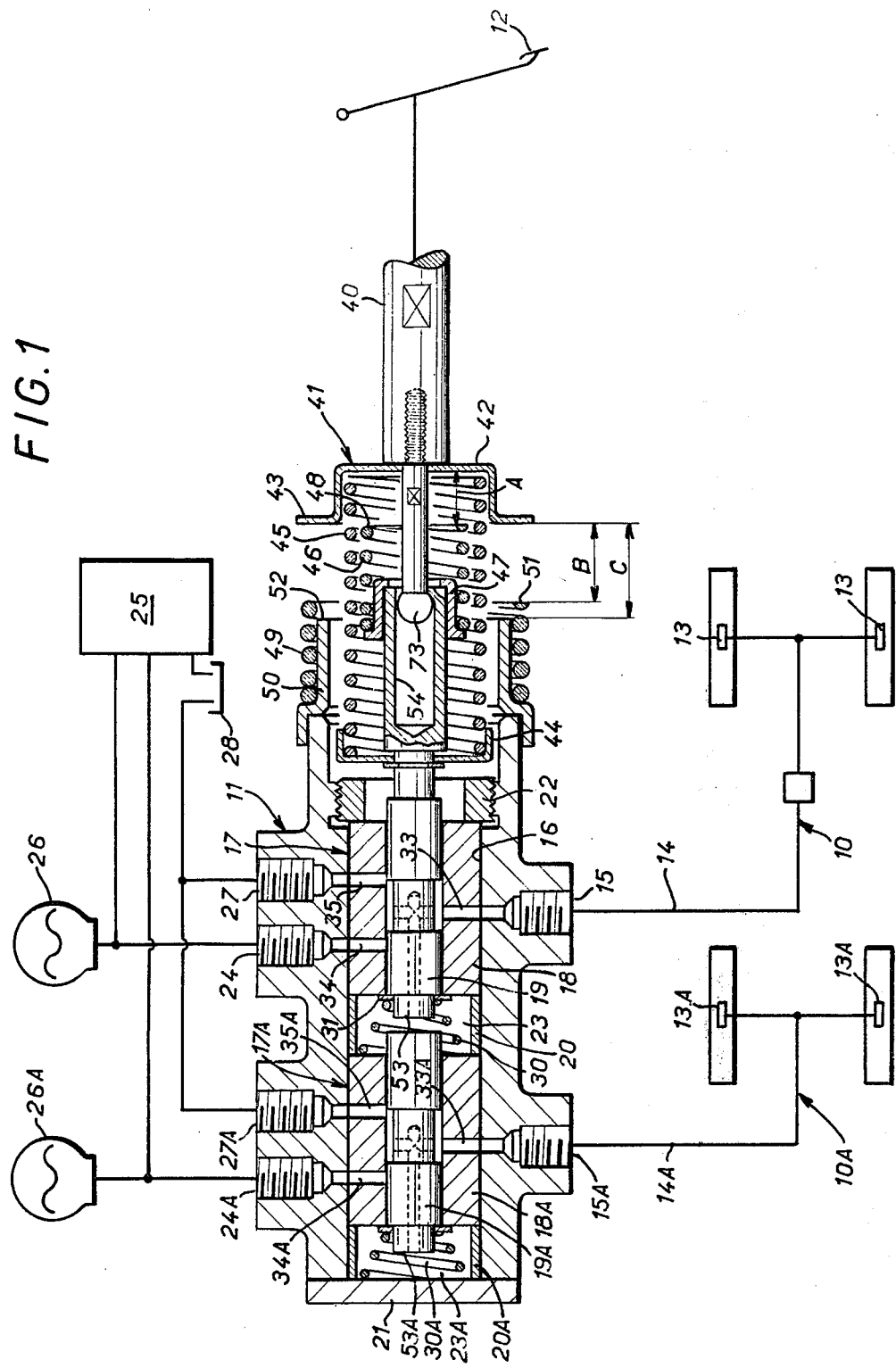
FIG. 1 is a view in section of an hydraulic control system of a braking apparatus according to the invention and shows schematically the braking circuits.

In FIG. 1, we see these two independent braking circuits at 10 and 10A, a control unit at 11 integral with the chassis of the vehicle and a pedal at 12 to pressurise the circuits 10 and 10A for the purpose of braking.

Each circuit 10, 10A comprises brake cylinders 13, 13A at the vehicle wheels, the cylinders being supplied by a pipe 14, 14A connected by means of a respective supply orifice 15, 15A to the control unit 11.

The control unit 11 has an axial bore 16 in which there are fitted two distributor valves 17 and 17A, respectively associated with the two circuits 10 and 10A. Each distributor valve 17, 17A comprises a fixed jacket 18, 18A engaged in the bore 16 of the unit 11, and a movable slide 19, 19A fitted slidingly in said jacket. The jackets 18 and 18A are spaced by a tubular spacer 20, whereas the jacket 18A is spaced from an end 21 of the unit 11 by a tubular spacer 20A. The axial stack 20A, 18A, 20, 18 is locked against the end 21 by a screwthreaded ring 22 opposite to the latter and screwed to the unit 11. A counterpressure chamber 23 is defined in the bore 16 between the jackets 18 and 18A, while a counterpressure chamber 23A is defined in the bore 16 between the jacket 18A and the end 21.

Each distributor valve 17, 17A co-operates, in addition to the supply orifice 15, 15A of the circuit 10, 10A, both with a pressure orifice 24, 24A connected to a plant 25 of assisting hydraulic pressure having a fluid pressure source such as a pump and a pressure accumulator 26, 26A, as well as with a return orifice 27, 27A to a reservoir 28 of the plant 25. Each pressure accumulator 26, 26A is made to contain fluid at a higher pressure than necessary for ordinary requirements to take into account the reduction in efficiency of the brakes when the latter are hot. Good results are obtained when the pressure of the accumulator 26, 26A is of the order of 150% of the value necessary for ordinary requirements.

The two distributor valves 17 and 17A have an identical construction and an analogous function. The distributor valve 17 will be described in further detail hereinbelow, said description being applicable to the distributor valve 17A with the same reference numbers but augmented by the index A.

The slide 19 of the distributor valve 17 (FIGS. 1 to 6) is subject to two opposing forces. One of these forces is developed by the hydraulic pressure of the braking circuit 10 in the chamber 23 and is exerted upon the left-hand end 29 of the slide 19. We see at 30 a return spring within the chamber 23, which spring 30 acts upon the slide 19 in the same sense and which, by virtue of a stop washer 31 co-operating with the left-hand wall 32 of the jacket 18, defines an extreme rest position of the slide 19 illustrated in FIG. 2.

The other opposing force is developed upon the slide 19, from right to left as viewed in the drawings, by the action of the pedal 12 acting on a set of various resilient means, which will be described in detail hereinbelow, and hence on the slide 19.

The jacket 18 of the distributor valve 17 has three orifices 33, 34, 35 which communicate with the orifces 15, 24 and 27 respectively of the unit 11.

The slide 19 of the distributor valve 17 comprises a median annular groove 36 which is adapted to come into communication either with the pressure orifice 34 (FIGS. 4 and 5) or with the return orifice 35 (FIGS. 1 and 2) or to be positioned between the two orifices (FIG. 6) depending upon the position of the slide 19. The annular groove 36 communicates permanently with the orifice 33 of the braking circuit 10, and likewise, with the counterpressure chamber 23, e.g. by a T-shaped bore 37 within the slide 19.

The various resilient means which are associated with the pedal 12 for the actuation of the slide 19 will now be described.

Said resilient means are constituted here by helical springs 45, 46 and 49 (FIG. 1).

A rod 40 is actuated by the pedal 12 and comprises a dome 41 having a crown 42 and a peripheral flange 43. The slide 19 comprises a cap 44.

The resilient stroke simulator means comprise the two springs 45 and 46. The spring 45 is interposed between the dome 41 and cap 44 and offers a resistance during the stroke of the pedal 12. When no action is exerted upon the pedal 12, the spring 45 is subjected, between the dome 41 and cap 44, to no load or low load, and in any case lower than the prestress of the return spring 30.

The spring 46 is fitted in parallel with the spring 45 but acts in a stepped manner, i.e. after a predetermined stroke A of the pedal 12. For this purpose the spring 46 is fitted on a bushing 47 integral with a sleeve 54, which is, in turn, integral with the slide 19. The sleeve has an open end and an opposing closed end adjacent the slide 19. The spring 46 has a free end 48 which is intended to be acted on by the crown 42 of the dome 41 after the stroke A.

Second resilient means are likewise provided and act between the pedal 12 and the unit 11 after the absorption of a stroke B. Said second resilient means perform a saturation function and comprise a helical spring 49 fitted on a sleeve 50 integral with the unit 11. The spring 49 has a free end 51 which is adapted to be acted on by the flange 43 of the dome 41 after the absorption of a stroke B. It will be noted that the stroke B is longer than the stroke A and that the total stroke of the pedal, designated C, is limited and defined by a rigid stop presented by the end 52 of the sleeve 50 to the flange 43 of the dome 41.

It is seen at 73 a ball head integral with the rod 40, and the ball head 73 is engaged slidingly in the sleeve 54 integral with the slide 19, to permit guidance of the rod 40.

The arrangement is advantageously made so that the ball head 73 never comes into abutment against the closed end of the sleeve 54 so that the operation of the spring 49 always occurs in the absence of such abutment.

It should be noted that the stroke of the slides 19 and 19A is of the order of a millimeter. This is the reason why the stroke simulator springs 45, 46 are provided to permit a stroke of the pedal 12 of the order of ten centimeters.

Figure 2:
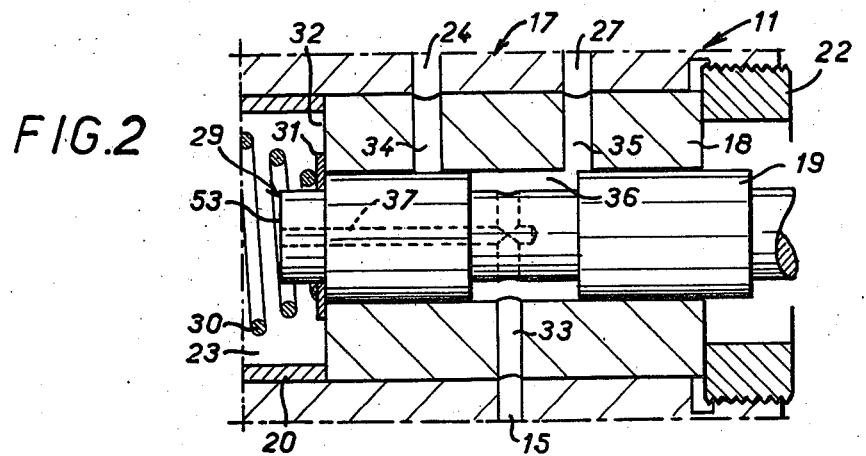
FIG. 2 is a view on a larger scale of a distributor valve slide of said control system in the rest position.
Figure 3:
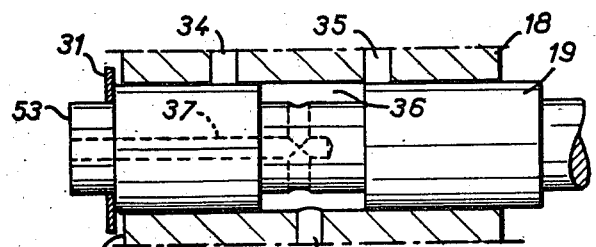
FIGS. 3, 4, 5 and 6 are views similar to FIG. 2, but respectively show the slide in various work positions.
Figure 4:
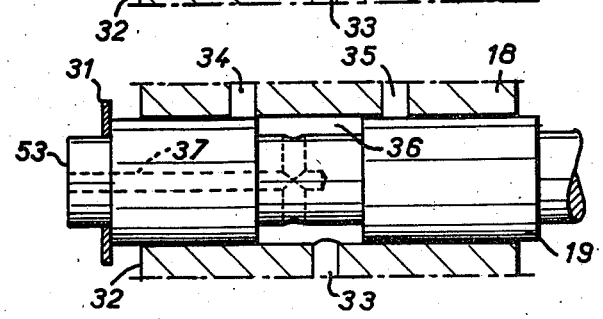
Figure 5:
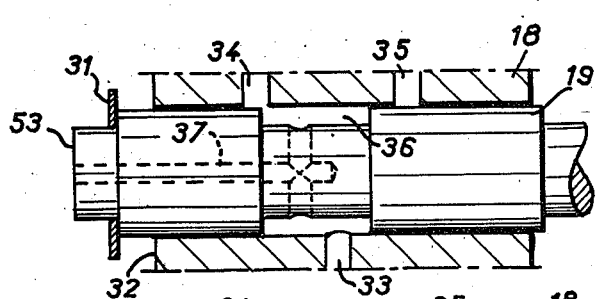

Until the pedal 12 is depressed, the slide 19 occupies the rest position illustrated in FIG. 1 and in FIG. 2. The chambers 23 and 23A, as well as the circuits 10 and 10A are connected to the reservoir 28.

When the pedal 12 is depressed, the dome 41 moves towards the left-hand side of FIG. 1, compressing the spring 45, then after the stroke A is absorbed, compressing the spring 46 fitted in parallel with the spring 45. The slide 19 then passes through the temporary position of FIG. 3, in which the return orifice 35 communicating with the reservoir 28 becomes masked, then through the active position of FIG. 4, in which the pressure orifice 34 will start to communicate with the groove 36.

Figure 6:
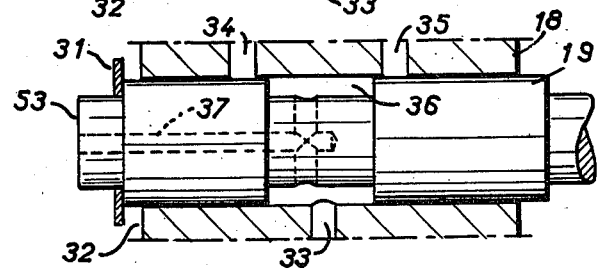

The flange 43 of the dome 41 has not yet reached the end 51 of the saturation spring 49. The slide 19 can be brought into the work position of FIG. 5, where, temporarily, the pressure orifice 34 is more exposed, which has the effect of increasing the pressure in the counterpressure chamber 23, and consequently tending to return the slide 19 towards the right-hand side (FIG. 6). A kind of equilibrium of forces on the slide 19 is then established between the action upon the pedal 12 and the reaction in the chamber 23, while the pressure is developed in the two circuits 10 and 10A. At the same time the pressure rise in the chamber 23 actuates the slide 19A in the same way as the slide 19 is itself actuated by the pedal 12.

The vehicle is therefore strongly decelerated under comfortable conditions of normal functioning in which the assisting hydraulic means 25 acts and in which the driver is totally in control of the braking throughout.

If the driver must accentuate the braking in order to obtain a rapid stop, he can do so by virtue of an increased pressure upon the pedal 12, which then has the effect of bringing the flange 43 of the dome 41 into abutment with the end 51 of the saturation spring 49. The driver is then warned by an increased resistance offered by the spring 49, but he can deliberately increase the braking with the object of achieving the rapid stopping of the vehicle, but without risk of a dangerously high pressure. Only a part of the increase in pressure upon the pedal 12 serves to increase the braking pressure, whereas the other part is proportional to the flattening of the saturator spring 49 and is absorbed by the unit 11 integral with the chassis of the vehicle.

If the circuit 10 is defective, braking may be achieved under good conditions solely with the circuit 10A. Because the pressure in the counterpressure chamber 23 will have fallen to zero, an end 53 of the slide 19 can come into abutment against the slide 19A and the pedal 12 acts upon said slide 19A, which then permits braking by the circuit 10A alone.

If it is the circuit 10A which is defective, an end 53A of the slide 19A comes into abutment against the end 21 of the unit 11 and suitable braking may be achieved by the circuit 10 alone by virtue of the slide 19.

Figure 7:
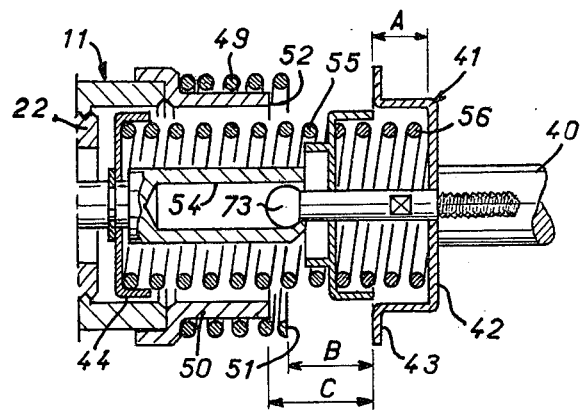
FIG. 7 is a partial view similar to FIG. 1, but shows a variant of assembly of the stroke simulator springs.

In the example which has just been described with reference to FIGS. 1 to 6, the two springs 45 and 46 of the resilient simulation means are fitted in parallel with a stepped action. In the variant illustrated in FIG. 7, the arrangement is similar to that which has just been described with reference to FIGS. 1 to 6, but the two springs 55 and 56 of the resilient stroke simulator means are disposed in series here.

In another variant (FIG. 8) the resilient stroke simulator means and the resilient saturator means are both constituted by an elastomer block 60. The block 60 has a body 61 of generally tubular elongate shape with two integral flanges disposed at its ends, one of which flanges 62 is engaged in the dome 41, whereas the other flange 63 is engaged in the cap 44. The block has an end 64 engaged in the crown 42 of the dome 41 but only a central part of the end 64 abuts the crown 42, whereas a peripheral part 65 of the end 64 is spaced from the crown 42. The flange 62 is connected to the body 61 and to said peripheral part 65 by a thin annular zone 66 surrounded by a projecting peripheral annular bead 67 abutting against the flange 43 of the dome 41.

Figure 8:
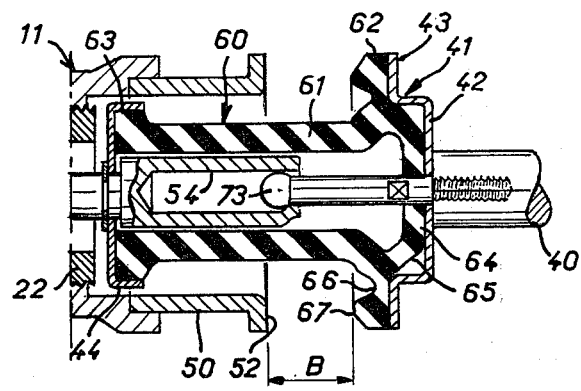
FIG. 8 and FIG. 9 relate to two other variants, wherein the resilient stroke simulator means and the resilient saturator means are constituted by one and the same elastomer block.

It is the tubular body 61 of the block 60, adapted for barrel-shaped deformation, which performs the function of the resilient stroke simulator means, whereas the bead 67, which is adapted to come into abutment against the end 52 of the sleeve 50, by flattening, after absorption of the stroke B, performs the function of the resilient saturator means. The functioning of the block 60 of FIG. 8 is similar to that of the springs 45, 46 and 49 described with reference to FIGS. 1 to 6.

Figure 9:
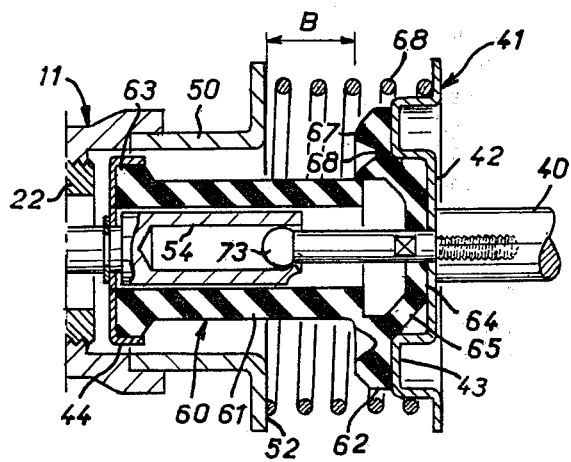

Reference will now be made to FIG. 9, where the arrangement is similar to that which was described with reference to FIG. 8, but in which the second resilient means comprise not only the resiliency of stroke saturator means 67, but also a moderator spring 68 acting permanently between the dome 41 and the end 52 of the sleeve 50. The spring 68 permits proportionating of the optimum resistance which is opposed to the depression of the pedal 12 along the entire stroke of the latter, thus performing the function of a moderator spring.

It will be appreciated that the function of the moderator spring 68 is to permit only a fraction of the force applied by the pedal 12 to be applied to the slide 19, whereas the other fraction is transmitted to the unit 11 in the form of an abutment reaction and is proportional to the flattening of the spring 68. Obviously, such a moderator spring 68 may be provided in case of need in the apparatus of FIG. 1 or in that of FIG. 7. It will be observed that the invention is applicable to all kinds of hydraulic control systems, not solely braking control systems, but also all other control systems, e.g. hydraulic-assisted braking control systems.

I claim:

1. A hydraulic control system for a motor vehicle braking apparatus having at least one hydraulic braking circuit, said hydraulic control system comprising a control unit housing, a brake pedal, a hydraulic booster having a fluid pressure source and a reservoir, a distributor valve having a slide movably mounted in said control unit between a rest position for bringing said braking circuit into communication with said reservoir and an operative position for bringing said braking circuit into communication with said fluid pressure source, said slide being subjected to two opposing forces, one of said opposing forces being developed by said pedal and urging said slide to said operative position and the other opposing force being developed by pressure in said braking circuit and urging said slide to the rest position, first resilient stroke simulator means interposed between said pedal and said slide, said first resilient stroke simulator means comprising a spring member operative substantially throughout the pedal stroke, and second resilient buffer means interposed between said pedal and said control unit housing comprising end-of-stroke buffer spring means operative near the end of the pedal stroke to relieve further force exerted by said pedal against the slide and to increase resistance to further displacement of the pedal.

2. A hydraulic control system according to claim 1, and a spring acting on said slide in the same direction as said other opposing force for defining the rest position of said slide.

3. A hydraulic control system according to claim 1, said first resilient stroke simulator means further comprising a second spring member operative after a first part of said pedal stroke.

4. A hydraulic control system according to claim 3, wherein said spring members of said simulator means are disposed in parallel.

5. A hydraulic control system according to claim 3, wherein said spring members of said simulator means are disposed in series.

6. A hydraulic control system according to claim 1, wherein said first resilient stroke simulator means comprises an elastomer block.

7. A hydraulic control system according to claim 1, wherein said resilient buffer means comprises a spring.

8. A hydraulic control system according to claim 1, wherein said resilient buffer means comprises an elastomer block.

9. A hydraulic control system according to claim 1, wherein said resilient stroke simulator means and said resilient buffer means comprise one and the same elastomer block.

10. A hydraulic control system according to claim 9, wherein said elastomer block comprises a tubular body, defining said resilient stroke simulator means, and a flange having a peripheral bead, said bead defining said resilient buffer means.

11. A hydraulic control system according to claim 1, wherein said second resilient means also comprises resilient moderator means acting along the entire stroke of the pedal.

12. A hydraulic control system according to claim 1, for a motor vehicle braking apparatus having two independent braking circuits, said distributor valve controlling a first braking circuit and the pressure of said first braking circuit controlling a second distributor valve which controls the second braking circuit.

13. A hydraulic control system according to claim 12, wherein said first and second distributor valves each comprise a fixed jacket in which the respective slide is mounted slidingly and which is engaged in an axial bore of the control unit housing, the two fixed jackets being stacked with tubular spacers which define counterpressure chambers in communication with the braking circuits.

* * * * *